FIG. 2A

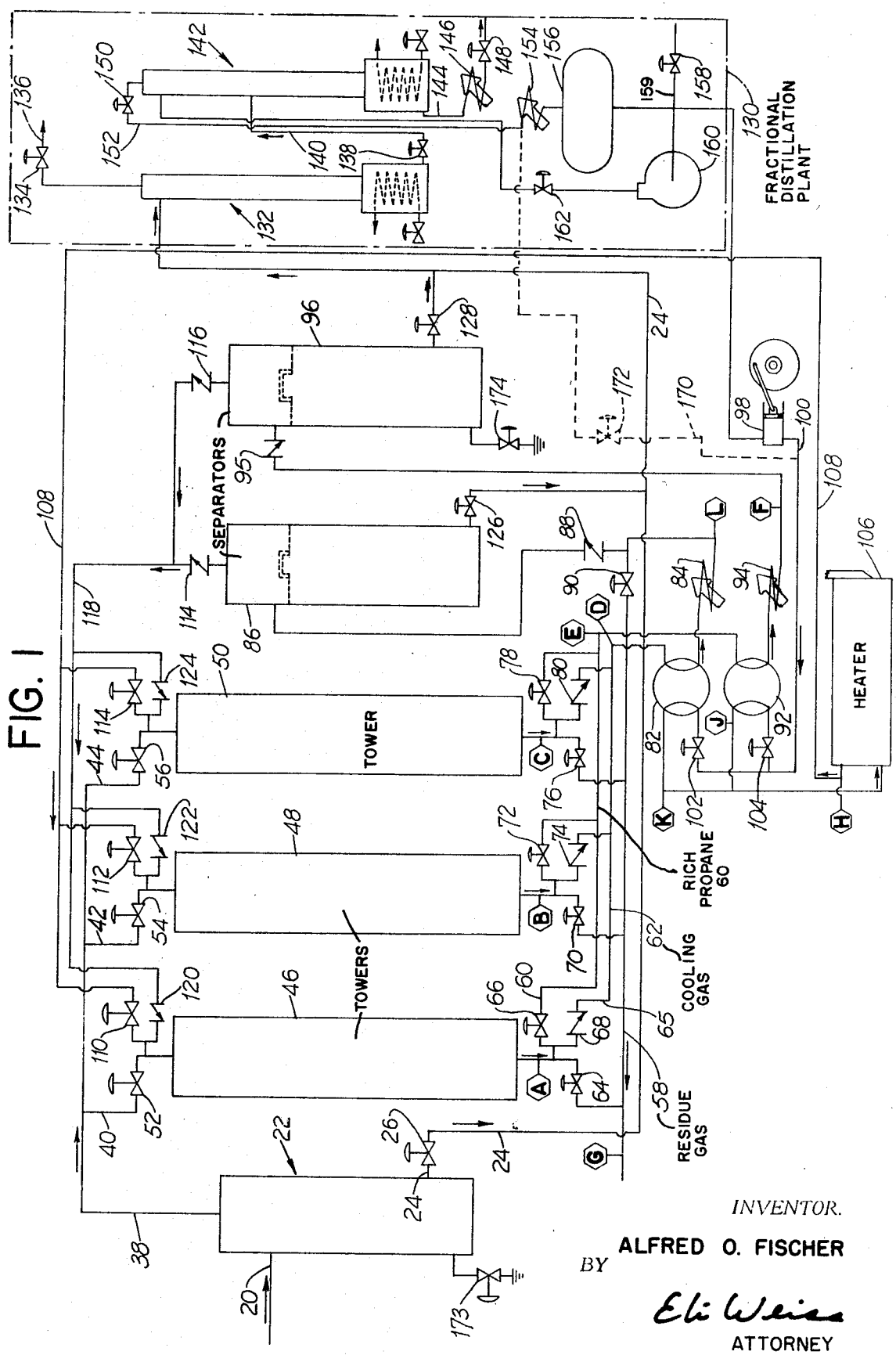

| EVENT | INTELLIGENCE | ACTION | RESULTING CONDITION | TOWER 52 | TOWER 46 (110) | TOWER 46 IN (120) |
|---|---|---|---|---|---|---|
| 1 | ⒹFALLING TEMP. REACHES 175° F. AND ⒺRISING TEMP. REACHES 475° F. AND 10 MIN. TIME LAPSE FROM EVENT 7 | START CYCLE PHASE I | 46 ON STREAM 48 COOLING, EFFLUENT TO RECYCLE 50 HEATING, EFFLUENT TO COOLING GAS HEADER | MODULATING | CLOSED | RECYCLE FLOW |
| 2 | ⒸRISING SG REACHES 0.70 (ALTERNATE: SG STARTS TO RISE) | PROPANE FRONT AT BOTTOM OF TOWER HEATING | AS ABOVE, EXCEPT 50 HEATING, EFFLUENT TO RICH PROPANE HEADER | | | |
| 3 | ⒹSG EQUALS SG AT Ⓖ | TOWER COOLING PURGED OF PROPANE | AS ABOVE, EXCEPT 48 COOLING, EFFLUENT TO RESIDUE GAS HEADER | | | |
| 4 | ⒹFALLING TEMP. REACHES 175° F. AND ⒺRISING TEMP. REACHES 475° F. AND 10 MIN. TIME LAPSE FROM EVENT 1 | START CYCLE PHASE II | 48 ON STREAM 50 COOLING, EFFLUENT TO RECYCLE 46 HEATING, EFFLUENT TO COOLING GAS HEADER | CLOSED | OPEN | NO FLOW |
| 5 | ⒶRISING SG REACHES 0.70 (ALTERNATE: SG STARTS TO RISE) | PROPANE FRONT AT BOTTOM OF TOWER HEATING | AS ABOVE, BUT 46 HEATING, EFFLUENT TO RICH PROPANE HEADER | | | |
| 6 | ⒹSG EQUALS SG AT Ⓖ | TOWER COOLING PURGED OF PROPANE | AS ABOVE, EXCEPT 50 COOLING, EFFLUENT TO RESIDUE GAS HEADER | | | |
| 7 | ⒹFALLING TEMP. REACHES 175° F. AND ⒺRISING TEMP. REACHES 475° F. AND 10 MIN. TIME LAPSE FROM EVENT 4 | START CYCLE PHASE III | 50 ON STREAM 46 COOLING, EFFLUENT TO RECYCLE 48 HEATING, EFFLUENT TO COOLING GAS HEADER | OPEN | CLOSED | NO FLOW |
| 8 | ⒷRISING SG REACHES 0.70 (ALTERNATE: SG STARTS TO RISE) | PROPANE FRONT AT BOTTOM OF TOWER HEATING | AS ABOVE, EXCEPT 48 HEATING, EFFLUENT TO RICH PROPANE HEADER | | | |
| 9 | ⒹSG EQUALS SG AT Ⓖ | TOWER COOLING PURGED OF PROPANE | AS ABOVE, EXCEPT 46 COOLING, EFFLUENT TO RESIDUE GAS HEADER | | | |
| 10 | SAME AS EVENT 1 | SAME AS EVENT 1 | SAME AS EVENT 1 | MODULATING | | |

INVENTOR.
ALFRED O. FISCHER
BY Eli Weiss
ATTORNEY

May 26, 1970    A. O. FISCHER    3,514,396
SHORT CYCLE ADSORPTION PROCESS WITH CAPTIVE
PROPANE REGENERATION SYSTEM
Filed Oct. 27, 1967    3 Sheets-Sheet 3

FIG. 2B

VALVE FUNCTIONING REQUIRED

| EVENT | 1 | 2 | 3 | 4 | 5 | 6 | 7 | 8 | 9 | 10 |
|---|---|---|---|---|---|---|---|---|---|---|
| TOWER 46 (OUT) 64 | OPEN | CLOSED | CLOSED | CLOSED | CLOSED | CLOSED | CLOSED | CLOSED | CLOSED | |
| TOWER 46 (OUT) 66 | CLOSED | CLOSED | OPEN | CLOSED | CLOSED | CLOSED | CLOSED | CLOSED | CLOSED | |
| TOWER 46 (OUT) 68 | NO FLOW | FLOW | NO FLOW | FLOW | NO FLOW | FLOW | NO FLOW | FLOW | NO FLOW | |
| TOWER 48 (IN) 54 | CLOSED | OPEN | MODU-LATING | MODULATING | MODULATING | MODULATING | MODULATING | CLOSED | CLOSED | |
| TOWER 48 (IN) 112 | OPEN | CLOSED | CLOSED | CLOSED | CLOSED | CLOSED | CLOSED | CLOSED | CLOSED | |
| TOWER 48 (IN) 122 | NO FLOW | NO FLOW | RECYCLE FLOW | RECYCLE FLOW | RECYCLE FLOW | RECYCLE FLOW | RECYCLE FLOW | NO FLOW | NO FLOW | |
| TOWER 48 (OUT) 70 | CLOSED | CLOSED | OPEN | OPEN | OPEN | OPEN | OPEN | CLOSED | CLOSED | |
| TOWER 48 (OUT) 72 | OPEN | CLOSED | CLOSED | CLOSED | CLOSED | CLOSED | CLOSED | OPEN | CLOSED | |
| TOWER 48 (OUT) 74 | FLOW | NO FLOW | NO FLOW | NO FLOW | NO FLOW | NO FLOW | NO FLOW | FLOW | NO FLOW | |
| TOWER 50 (IN) 56 | CLOSED | CLOSED | OPEN | MODU-LATING | MODULATING | MODULATING | MODULATING | MODULATING | MODULATING | |
| TOWER 50 (IN) 114 | OPEN | OPEN | CLOSED | CLOSED | CLOSED | CLOSED | CLOSED | CLOSED | CLOSED | |
| TOWER 50 (IN) 124 | NO FLOW | NO FLOW | NO FLOW | NO FLOW | NO FLOW | NO FLOW | NO FLOW | RECYCLE FLOW | RECYCLE FLOW | |
| TOWER 50 (OUT) 76 | CLOSED | CLOSED | CLOSED | CLOSED | CLOSED | CLOSED | CLOSED | OPEN | OPEN | |
| TOWER 50 (OUT) 78 | CLOSED | OPEN | CLOSED | CLOSED | CLOSED | CLOSED | CLOSED | CLOSED | CLOSED | |
| TOWER 50 (OUT) 80 | FLOW | NO FLOW | FLOW | FLOW | FLOW | FLOW | FLOW | NO FLOW | NO FLOW | |
| BY PASS 90 | CLOSED | OPEN | CLOSED | OPEN | CLOSED | OPEN | CLOSED | OPEN | CLOSED | |
| 88 | FLOW | NO FLOW | FLOW | NO FLOW | FLOW | NO FLOW | FLOW | NO FLOW | FLOW | |
| 114 | RECYCLE FLOW | NO FLOW | RECYCLE FLOW | NO FLOW | RECYCLE FLOW | NO FLOW | RECYCLE FLOW | NO FLOW | RECYCLE FLOW | |
| 95 | NO FLOW | FLOW | NO FLOW | FLOW | FLOW | FLOW | FLOW | NO FLOW | FLOW | |
| 96 / 116 | NO FLOW | RECYCLE FLOW | NO FLOW | RECYCLE FLOW | RECYCLE FLOW | RECYCLE FLOW | RECYCLE FLOW | NO FLOW | NO FLOW | |

CYCLE REPEATS

FIG. 3

| FIG. 2A | FIG. 2B |

INVENTOR.
ALFRED O. FISCHER
BY Eli Weiss
ATTORNEY

United States Patent Office 3,514,396
Patented May 26, 1970

3,514,396
SHORT CYCLE ADSORPTION PROCESS WITH CAPTIVE PROPANE REGENERATION SYSTEM
Alfred O. Fischer, Shreveport, La., assignor to American Machine & Foundry Company, a corporation of New Jersey
Filed Oct. 27, 1967, Ser. No. 678,567
Int. Cl. C10g 5/00
U.S. Cl. 208—340                                                 5 Claims

ABSTRACT OF THE DISCLOSURE

This invention relates to the purging of hydrocarbons from a bed of adsorption material by passing a stream of condensable hydrocarbon such as propane or the like through the bed.

---

This invention relates generally to the regeneration of a bed of dry desiccant used to adsorb selected components from a stream of natural gas and specifically to a closed type of cycle regeneration system.

Natural gas streams originating from natural gas wells are often saturated with water vapor and contain recoverable hydrocarbons.

Many of the problems of water and hydrocarbon removal from a gas stream by adsorbent material centers about the use of reactivation or regeneration fluid with which the water and hydrocarbons are removed from the saturated adsorption material.

The basic short cycle adsorption process used to dehydrate natural gas streams and extract the heavier hydrocarbons as liquids is a batch type of process where the gas is passed through an adorbent bed until the bed becomes saturated. After the adsorbent bed becomes saturated, it must then be regenerated.

In practice, this process approaches being a continuous process because normally two or more beds are utilized. While one bed is "on stream," one or more beds are being regenerated. Currently, regeneration consists of a two cycle phase, first heating and then cooling. Therefore, the natural number of towers for fastest cycling is three; one in the heating phase; one in the cooling phase; and, one on stream.

The concentrated adsorbate is driven from the beds and swept out of the towers within which the beds are located by hot natural gas. It has been customary to split off a portion of the saturated stream and use it for this purpose. The split-off reactivation stream is passed through a heater to raise its temperature to a level that will increase its ability to vaporize and remove water and hydrocarbons as it passes through the bed of adsorption material. After passage through the bed the reactivation stream is cooled in a condenser to extract the liquids.

If sufficient concentration has been achieved, some liquids will condense. The output of the condenser is received in a separator where the water and hydrocarbons are removed as separate liquid phases. The prior art shows how the gaseous portion of the reactivation stream may be either recycled or returned to the main stream on its way through the adsorption step.

Regardless of whether the reactivation stream is returned to the main stream, or recycled as a captive stream, there is a real problem of stripping the reactivation stream of hydrocarbon enrichment obtained from the saturated adsorption material.

It is believed that the enriched gas must, in a typical instance, contain a concentration of the desirable heavier component many times as great as that available from the main stream in order to produce condensation. In current procedures, probably 75% or more of the regeneration stream is composed of methane. Since the vapor pressure of methane is extremely high when compared to butane, pentane, or the like, the partial pressure available to condense these components is very low.

However, regardless of what the level of concentration of the heavier component must be, substantial "recycle" must be built up before appreciable condensation can take place.

It is an object of this invention to provide an apparatus which reduces substantially the need to recycle heavier components in order to have sufficient concentration for condensation.

It is another object of this invention to provide a closed cycle type of reactivation dehydration and hydrocarbon recovery system which uses a liquid pump rather than a gas compressor.

It is also an object of this invention to provide a system and an apparatus for adsorbing greater than normal quantities of components from a natural gas stream.

Other objects and many of the attendant advantages of this invention will be readily appreciated as the apparatus becomes better understood by reference to the following detailed description when considered in connection with the accompanying drawings wherein:

FIG. 1 is a diagrammatic diagram of an adsorption system incorporating the structure and novel features of the present invention; and, FIGS. 2A and 2B, when positioned as shown in FIG. 3, illustrates the flow schematic and functions for the invention.

The present invention contemplates a captive reactivation or regeneration gas stream of propane, propane-butane, or ethane-propane-butane mixtures as the heating and purging medium. If the sum of the partial pressures which the various components can exert under the temperature of the condenser is less than the system pressure, then the entire stream will condense.

The liquid thus condensed should then be distilled or otherwise refined. If propane and lighter is selected as the regenerating medium, the depropanizer will make a clean propane-butane cut. Butane-plus would appear as a bottom product and leave the process. Propane and lighter will appear overhead.

A pump can be used, taking suction from the reflux accumulator, to pump the propane to the heater via a preheat heat exchange. The heater continuously vaporizes and superheats the propane to about 600° F. The hot propane then flows through the tower being heated. Thus, propane brings the bed to deadsorption temperature and also actually carries off the desired product.

It is to be noted here that the initial heating of the bed can vary depending upon the type of adsorbent material used in the bed. The initial heating of a bed of silica gel, for example, could be with hot methane, followed by a subsequent switch to hot propane. If propane were used initially, it could be cooled to its dew point while passing through the cool bed, and damage the bed as silica gel can be damaged by hydrocarbons in liquid form. Charcoal is not this vulnerable and, therefore, where a bed of charcoal is used, the initial heating with hot methane is not required. The structure as illustrated in FIG. 1 uses a bed of charcoal and, as such, the primary heating of the bed with methane is not required.

Referring to FIG. 1, a feed stream which is to be dried and its condensable hydrocarbon contents removed is fed through an inlet line 20 to an inlet separator 22. The separator 22 may take any one of several configurations wherein water, liquid and gaseous hydrocarbon separation occurs in a satisfactory manner. The separation process which occurs in the inlet separator 22 removes the liquids present in the feed stream which flows through the inlet line 20. Water is removed from the inlet separator, and from the process, through valve 173. The hydrocarbon liquids, are removed from the inlet separator through liquid outlet line 24. A control valve 26 regulates the rate of removal of the fluids from the separator through line 24 to a fractional distillation plant 130 which can take any one of several configurations. As shown, ethane and lighter components are separated from the propane and heavier in a deethanizer 132, and propane is separated from pentane and heavier in a depropanizer 142.

The feed stream from which considerable hydrocarbons and water have been removed flows out of the inlet separator 22 through line 38 and three branch lines 40, 42, 44 to adsorbent towers 46, 48, 50. Valves 52, 54, 56 regulate the flow of the feed stream through the towers 46, 48 and 50 respectively.

The adsorbent towers can be in the form of cylinders having their longitudinal axes positioned in a vertical plane. The feed stream enters the adsorbent towers at the top, flows downwardly and leaves at the bottom.

The adsorbent towers contain adsorbent material which can be charcoal, silica gel or the like. Charcoal has been used successfully in this invention to recover a large percentage of the condensable hydrocarbons in main streams. However, it is to be understood that the selection of the specific adsorption material, and the arrangement of flow within the towers depends upon the specific design conditions and arrangements desired.

The output of adsorbent tower 46 can flow through lines 58, 60, 62. A control valve 64 controls the flow through line 58; a control valve 66 regulates the flow through line 60; and, a check valve 68 controls the flow through line 62.

In a like manner, the flow from towers 48, 50 can flow through the three paths 58, 60, 62. For tower 48, control valves 70, 72 regulate the flow through lines 58, 60 respectively and check valve 74 controls the flow through line 62. For tower 50, control valves 76, 78 regulate the flow through lines 58, 60 respectively and check valve 80 controls the flow through line 62.

Line 58 can be considered to be the residue gas header; line 60 can be considered to be the rich propane header; and, line 62 can be considered to be the cooling gas header.

The cooling gas header 62 is connected to direct gas through a first heat exchanger 82 and a second heat exchanger 84. The output of the second heat exchanger 84 is connected, by means of a branch circuit, to a tailing separator 86 through a check valve 88; and, to the residue gas header 58 through a control valve 90.

The rich propane header is connected to feed gas through a first heat exchanger 92 and a second heat exchanger 94. The output of the second heat exchanger 94 is connected to feed a regeneration separator 96 through a check valve 95.

Heat exchangers 84, 94 are illustrated as being of the forced air type wherein air is directed across the heat transfer surface to cool the captive fluid.

Heat exchangers 82, 92 are shown as using a closed cooling system to effect the transfer of heat.

A circulating pump 98 which is a liquid pump, not a gas compressor is connected to drive the coolant through conduit 100 and either or both heat exchangers 82, 92 depending upon the condition of control valves 102, 104 and then through a propane heater 106 to header 108. Adsorbent tower 46 is connected to header 108 through a control valve 110; adsorbent tower 48 is connected to header 108 through a control valve 112; and, adsorbent tower 50 is connected to header 108 through a control valve 114.

The uncondensed gas from the tailing separator 86 and regeneration separator 96 are fed through check valves 114, 116 to header 118 which is connected to the adsorbent towers 46, 48, 50 through check valves 120, 122, 124 respectively.

The liquid outlet line 24 is connected to receive the condensible product from the tailing separator 86 through a control valve 126; and the condensible hydrocarbon product from the regeneration separator 96 through a control valve 128. Condensed water, if any, is dumped from the regeneration separator through valve 174 and leaves the process.

The liquid outlet line 24 is connected to feed a fractional distillation plant 130. Several choices of fractional distillation plants can be utilized, the one, or combination of distillation plants selected being a matter of design involving the characteristics of the main stream, the product desired, the equipment available and the like.

It is desirable, however, that the fractional distillation plant produce from the primary raw product, aside from the desired products which will vary from plant to plant, a satisfactory reactivation or regeneration fluid such as propane for feeding into the circulating pump 98.

The fractional distillation plant 130 illustrated for convenience only, incorporates a deethanizer 132 which can produce as its overhead product, methane and ethane; and, as its bottom product, propane and heavier products.

The overhead vapors are removed through a back pressure valve 134 and pipe 136; and the liquid bottom product of propane and heavier is fed through a control valve 138 and pipe 140 to a depropanizer 142.

The depropanizer produces propane as its overhead product, and butane and heavier remain as its liquid bottom product. The liquids are removed from the depropanizer through the pipe 144, fed through a product cooler means 146 which can be of the forced air type; then through a control valve 148 to a storage area.

The overhead vapor, propane, flows from the depropanizer through a back pressure valve 150 and pipe 152 to a condenser means 154, which can be of the forced air type, and on to an overhead accumulator 156. The propane which emerges from the accumulator 156 flows through a four way connector 159, to the circulating pump 98; to a storage area through a control valve 158; and, to the depropanizer 142 through a reflux pump 160 and control valve 162.

In operation, one adsorbent tower is on stream, a second adsorbent tower is in the cooling phase of the cycle and a third adsorbent tower is in the heating phase of the cycle. In the figures, capital letters identify points at which process information is monitored or the stream composition may be of interest. The cycle has three major phases, with two adjustments being made within each phase at some interval of time after its start, to provide for on stream heating and cooling phases for each tower.

When the towers are switched from one phase to another, the tower that is to be heated will be full of lean dry gas—primarily methane—as it will have recently completed the on-stream phase. The gas in the tower is shunted through the associated check valves 68, 74 and 86 into the cooling gas header 62 during the successive phases.

During the heating phase of a tower, hot propane vapor is introduced into the top of the tower. At the start of the heating phase, the tower is full of methane, and, therefore, the specific gravity of its effluence will be low—about 0.55. As the propane begins to pass through the tower, the specific gravity of the effluent will rise, reaching a final value in excess of 1.0. A clear-cut interface between propane and methane can not be expected, but rather an increasingly propane-rich mixture. Regardless of how it will occur, the composition of the effluent issuing from the tower will be reflected by its specific gravity, and necessary adjustments can be made accordingly.

When the effluent stream of the tower being heated is methane rich, it bypasses the regeneration separator 96 to avoid excessive contamination of the primary product and is shunted into the tailing separator 86 after passing through the exchangers 82, 84. As the concentration of propane in the stream becomes greater, its dew point will be reached and the propane will condense. The condensed liquids will be trapped in the tailing separator 86. Any propane which is not condensed from the stream will be recycled into the on-stream tower 46 through check valve 120, during the first phase.

As the concentration of propane increases to the point where the effluent becomes totally condensable, as determined by a specific gravity measurement taken at location C, the stream is switched to flow into the regeneration separator 96 via the rich propane header 60 and the heat exchangers 92 and 94 by opening the valve 78.

Similarly, the tower to be cooled is at the start of the cycle phase and, therefore, is full of hot propane. It is desirable to save this propane. Until the tower has been purged as indicated by a specific gravity reading at location D this effluent is fed through the heat exchangers 82 and 84 to the tailing separator 86. The propane that is condensed is separated while the remaining vapor is recycled.

During the cooling phase, raw cool feed gas is fed into the top of the tower and is heated as it passes through the tower. It emerges from the bottom of the tower at a substantial increase in temperature. Shortly after the start of the introduction of raw cool feed gas into the top of the tower, the top layers of adsorbent in the tower are cooled sufficiently to permit the initiation of the adsorption process. Thus, the inlet gas undergoes or experiences a compositional as well as a temperature change, and the tower being cooled actually functions to some extent, as an on-stream tower. At that instant when the tower that is being cooled begins to function in the same manner as the on-stream tower is functioning, which occurs when the specific gravity of the stream at location D is equal to or less than the specific gravity of the stream at location G, then the effluent of the tower being cooled need only be cooled before it may be admitted directly into the residue header 58.

During the early part of the first cycle phase, valve 54 is open to permit gas to flow into tower 48; and valve 52 is open but modulating to permit gas to flow into and through the tower 46, which is on stream. The valve is modulated to maintain the temperature of the gas at location L at a preset constant value to assure that reasonable cooling is achieved while, at the same time, loading the exchangers to their maximum capacities.

When the adjustment is signalled by the occurrence of a specific gravity reading at location D being equal to the specific gravity reading at location G, the effluent from the tower in the cooling phase is admitted directly to the residue gas header by opening valve 90. It is to be noted that the temperature of the gas at location L is not, in itself, significant; it is significant in that this gas, at its temperature, when mixed with gas from the on-stream tower, should not exceed a temperature which is acceptable to the pipeline at location G. A temperature of 130° F. was found to be acceptable to the pipeline. Therefore, the control point should be at location G, not at location L, after the adjustment.

The temperature of the effluent from the tower in the cooling phase of the cycle rises substantially after the start of its cycle, and it is possible, in some instances, that peak temperatures can occur after the valve 90 has opened. Consequently, the flow through the tower in the cooling phase of the cycle must be restricted. As such, valve 54 is supplied, after the adjustment (opening of valve 90) with the same modulating signal, reversed, which is fed to and controls valve 52. In this arrangement, the flow is split between the hot tower 48 and the cold tower 46 in such proportions that the temperature of the combined effluent remain substantially constant.

In operation, during the first phase of the cycle, tower 46 is on stream, tower 48 is being cooled, and tower 50 is being heated. Valve 52 is open to permit the natural gas to flow to tower 46, imposing a pressure drop sufficient to force the gas through the cooling system. Clean, dry gas leaves tower 46 through valve 64. Valve 66 is closed and check valve 68 cannot pass gas because its downstream pressure exceeds its upstream pressure. Any vapors remaining in regeneration separator 96 or tailing separator 86 are recycled to tower 46 through check valve 120.

With tower 48 full of propane early in the first phase of the cycle, valve 54 is opened to admit inlet gas. Valves 70 and 72 are both closed to force the flow from tower 48 through valve 74 into the cooling gas header 62, through heat exchangers 82 and 84, and into the tailing separator through the check valve 88. Valve 90 is closed. Any portion of this stream which condenses will be trapped in the tailing separator 86, and the remaining vapors will be recycled through check valves 114 and 120 to tower 46.

When the specific gravity of the gas at location D is as low as (equals) that of the gas at location G, valve 90 opens to permit the stream to flow directly to the residue gas header 58.

With tower 50 full of methane early in the first cycle phase, valve 114 is opened to admit superheated propane vapor. Valves 76 and 78 are both closed, forcing the flow from tower 50 through check valve 80 into the cooling gas header 65, where it comingles with the effluent stream from tower 48 as described above.

When the specific gravity of the stream from tower 50, as monitored at location C, rises to a predetermined value (or, alternately, starts to increase), valve 78 will open. The stream will now flow into the rich propane header, through heat exchangers 92 and 94, through check valve 95, into the regeneration separator 96. Virtually the complete stream will now condense in the heat exchangers 92 and 94 and be trapped in the regeneration separator 96. Whatever vapors still exist will be recycled through check valve 120 to tower 46.

In FIG. 1, hydrocarbon liquids from the inlet separator 22, regeneration separator 96 and tailing separator 86 are combined to form the deethanizer feed.

The methane and ethane percentage of the feed of the inlet separator 22 is higher than the feed from either the regeneration separator 96 or the tailing separator 86. Therefore, in some instances, it may not be desirable to permit the feed from the inlet separator 22 to enter the distillation plant 130.

It is to be understood that any type of fractional distillation plant 130 other than that specifically shown can be used. In FIG. 1, the feed entering deethanizer is split, methane and ethane emerging at the top and propane and heavier being fed through valve 138 and line 140 to the depropanizer 142. In the depropanizer 142, propane passes out through line 152 and butane and heavier passes out through line 144.

The propane in line 152 is fed through heat exchanger 154 and accumulator 156 to liquid circulating pump 98.

If desired, a line 170 which can be selectively opened or closed by valve 172 can be provided to return to the overhead accumulator 156 any propane being pumped which is in excess of the process requirements.

FIGS. 2A and 2B, when positioned as shown in FIG. 3 illustrates the function diagram of the invention. Referring to FIGS. 2A and 2B, the following is to be noted:

The control valves for the on-stream towers respond to temperature intelligence at location L commencing with the start of each cycle phase, 125° F. set point. Valve opens with temperature increase. With events 3, 6 and 9, control switches to temperature intelligence at location G, set point 130 F.; same valve action. With these latter events the control signal is also reversed and transmitted to the control valve for the corresponding tower cooling. This latter valve switches from full open to (Reverse) Modulating.

Recycle flow consists of those vapors not condensed and separated in 86 and 96. The rate will diminish as each cycle phase progresses.

For the propane rate control, the temperature at location F should not exceed approximately 200° F.; and, the temperature at location H should not be less than approximately 700° F. The propane rate should be adjusted to control temperatures; the propane flow to stop when a rising temperature at location E reaches approximately 475° F.

Propane preheat (heat exchangers 82 and 92) control will attempt to maintain the temperature at location K equal to the temperature at location J. The exchangers 82 and 92 can be in multiple sections. Valves 102 and 104 are representative of an inlet valve for each section. As the cooling load shifts from exchanger 82 to exchanger 92 with the progress of the cycle, sections of exchanger 82 will be closed and sections of exchanger 92 will be opened to lean propane flow.

Obviously, many modifications and variations of the present invention are possible in the light of the above teachings. It is, therefore, to be understood that within the scope of the appended claims the invention may be practiced otherwise than as specifically herein described.

What is claimed is:

1. The method of removing condensable hydrocarbons from a main flow stream of natural gas which comprises contacting a bed of adsorbent material with the main flow stream of natural gas whereby condensable hydrocarbons are adsorbed by the bed material; heating a captive reactivation flow stream consisting of one of the condensable hydrocarbons in liquid form; contacting the bed of adsorbent material with the heated captive reactivation flow stream; cooling the captive reactivation flow stream after passing through said adsorbent whereby said condensable hydrocarbons are recovered; and interrupting the flow of the captive reactivation stream to the bed after the bed has had its condensable hydrocarbons vaporized by the captive reactivation flow stream.

2. The method of claim 1 comprising, cooling the bed with a portion of the main flow stream whereby the bed is conditioned to again remove hydrocarbons from the main flow stream by adsorption.

3. The method of claim 2 comprising combining the portion of the main flow stream used to cool the bed with the main flow stream to reduce the temperature of the portion of the main flow stream.

4. The method of claim 3 comprising measuring specific gravity of the captive reactivation flow stream from the bed to indicate the removal of condensable hydrocarbons from the bed of the reactivation flow stream.

5. The method of claim 1 wherein said reactivation flow stream is propane.

References Cited

UNITED STATES PATENTS

| | | | |
|---|---|---|---|
| 3,197,415 | 7/1965 | Hendrix | 208—340 |
| 3,285,846 | 11/1966 | King et al. | 208—28 |
| 3,324,669 | 6/1967 | Cooper et al. | 62—18 |

HERBERT LEVINE, Primary Examiner

U.S. Cl. X.R.

62—18, 36, 37